US006799241B2

(12) United States Patent
Kahn et al.

(10) Patent No.: US 6,799,241 B2
(45) Date of Patent: Sep. 28, 2004

(54) METHOD FOR DYNAMICALLY ADJUSTING A MEMORY PAGE CLOSING POLICY

(75) Inventors: Opher D. Kahn, Zichron-Yacov (IL); Jeffrey R. Wilcox, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 484 days.

(21) Appl. No.: 10/039,087

(22) Filed: Jan. 3, 2002

(65) Prior Publication Data

US 2003/0126354 A1 Jul. 3, 2003

(51) Int. Cl.[7] .............................................. G06F 12/00
(52) U.S. Cl. ...................................... 711/105; 711/154
(58) Field of Search ................................ 711/105, 154

(56) References Cited

U.S. PATENT DOCUMENTS

| 6,269,433 | B1 | | 7/2001 | Jones et al. | |
| 6,389,514 | B1 | | 5/2002 | Rokicki | |
| 6,604,186 | B1 | * | 8/2003 | Fanning | ..................... 711/209 |

OTHER PUBLICATIONS

International Search Report, Apr. 11, 2003.

* cited by examiner

Primary Examiner—Jack A. Lane
(74) Attorney, Agent, or Firm—Blakely, Sokoloff, Taylor & Zafman LLP

(57) ABSTRACT

A method for dynamically adjusting a memory page-closing policy for computer systems employing various types of DRAM memory partitioned into one or more memory banks, and circuitry for implementing the method. In general, the method comprises monitoring memory accesses to memory banks and dynamically adjusting the memory page closing policy for those memory bank based on locality characteristics of its memory accesses so that memory latencies are reduced. In one embodiment, in response to memory requests from a computer system processor, memory accesses to the DRAM memory are made on a page-wise basis. As each memory page is accessed, a page-miss, page-hit or page-hit state is produced. Depending on the page access states, which generally will reflect the locality characteristics of (an) application(s) accessing the memory, a page-close set point is adjusted. When a timing count corresponding to the page exceeds the page-close set point, the memory page is closed.

20 Claims, 4 Drawing Sheets

TO & FROM
LOCAL/WIDE AREA
NETWORK/INTERNET

US 6,799,241 B2

METHOD FOR DYNAMICALLY ADJUSTING A MEMORY PAGE CLOSING POLICY

FIELD OF THE INVENTION

The present invention concerns the use and operation of computer memory (e.g., DRAM) in general; and, more specifically, to a method for dynamically adjusting a DRAM page closing policy and memory controller and circuitry for performing the method.

BACKGROUND

Memory controller circuits can be used in a variety of computer systems (e.g., desktop personal computers, notebook computers, personal digital assistants, etc.) to facilitate the computer system's processor in accessing memory chips. These memory chips generally include the main memory of the computer system, which typically comprises a plurality of dynamic random access memory (DRAM) chips, which may comprise, for example, synchronous DRAM (SDRAM) chips, extended data out (EDO) DRAM chips, Rambus (R)DRAM chips, DDR (double data rate) SDRAM chips, etc. The memory controller provides a memory interface for connecting to one or more of such DRAM chips, and a system interface to connect to the system processor(s). The memory controller uses these interfaces to route data between the processor and the DRAM chips using appropriate address and control signals.

Generally, the DRAM chips used in modern computers are organized in groups and mounted on one or more "memory modules." The most common memory modules in use today are known as DIMMs (Dual In-line Memory Modules), which comprise a small circuit board having a 168-pin double-sided connector at its base on which a plurality of DRAM chips and one or more controller chips are mounted. (Alternatively, the DRAM chips may have embedded controller circuitry built in.) Other common memory modules include 144-pin Small Outline DIMMS (SODIMMS), which are used in laptop computers, and SIMMs (Single In-line Memory Modules), as well a various other types of configurations.

Typically, a modem DIMM can store 32, 64, 128, 256, and 512 megabytes (Mb) of memory, which corresponds to the total memory capacity of the memory chips on the DIMM. The memory on each DRAM chip is logically configured in a memory array comprising a plurality of rows and columns of memory "cells." Each memory cell has a particular address, and stores a single bit of data. This memory array is then logically partitioned into one or more "banks" of memory. In many DRAM chips, there are four banks of memory. In modem DRAM chips, such as page-mode, EDO, and SDRAM chips, memory is accessed on a "page" basis, wherein the memory cells for a given row within a bank comprises a "page" of memory. Memory pages typically comprise 512, 1024 (1K), 2048 (2K), 4098 (4K), 8196 (8K), 16392 (16K) or 32,768 (32K) bits of data.

Accessing DRAM is generally a multi-step process that is performed by the memory controller in the following manner. First, the page or pages corresponding to the requested data or instructions are identified. Once the page or pages are known, the appropriate bank corresponding to the page(s) is/are determined. The memory controller then "opens" the appropriate bank(s) and appropriate page(s). Generally, the particular page(s) of data requested will initially be in one of three states: page hit, page empty, or page miss. If the state is a page hit, the desired page is already loaded into a bank of sense amplifiers (amps) corresponding to the memory bank the page is stored in. If a page empty state is encountered, data corresponding to the desired page will need to be loaded into an appropriate sense amp bank via an "activate" command before it can be accessed. If the state of the bank is a page miss, the specified bank contains a different page of data than that requested. This existing page will first be required to be "closed," which comprises writing it back to the memory array using a "precharge" command, and then the appropriate page will need to be loaded into the sense amp bank using the activate command.

The foregoing three states have an impact on access latency. A page hit state means the page is ready to be accessed with no additional latency. A page empty state requires an activate command, while a page miss requires both pre-charge and activate commands, each of which may take one or more clock cycles. The actual penalty (i.e., delay) for each type of access will depend on the memory technology, memory organization and architecture, and on other rules specific to each memory technology. The general rule however is that a page hit is fastest, and a page empty is slower, and a page miss is slowest.

Typical existing page-management policies include "page-open," "page-close" and timer mechanisms. Under the page-open policy, pages are left open until they need to be closed due to a page miss (or need to be closed due to some other memory architecture rule such as the need to refresh them). Under page-close policy, pages are closed with a "precharge" command as soon as possible after the current access completes. With timer mechanisms, "idle" timers are used to determine that memory in general, or a specific bank in particular, have been idle for N clock cycles. If N clock cycles have expired with no accesses, the page(s) is/are closed. The counters may be per bank, in which case only that bank's pages will be closed when the timer expires. Other implementations may have timer per row or for all of the system memory, in which case all pages in a row or in all of the system memory may be closed when the timer expires.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

Embodiments of a method for dynamically adjusting a DRAM page closing policy and memory controller circuit for performing the same are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In conventional computer systems, the page-closing policy is controlled by the memory controller in a generally static manner. For example, a page closing policy mode may be set during boot-up in which either a specific bank or all banks of sense amps are pre-charged on a page miss to close the page(s), otherwise the banks are left alone. In other cases, the page closing policy is set based on a "typical" predetermined memory access pattern. Oftentimes, a single page-closing management mode is maintained during the entire execution of a session (i.e., from boot-up until the computer is shut down or reset). The problem with this static approach is that different applications running on the same system may exhibit totally different memory access problems. One application may show semi-random access patterns, requiring a "page-close" policy for best performance, while others may exhibit good locality (i.e., repeated access to the same portion of memory), requiring a "page-open" or "timer" mechanism for best performance. Even the same application may, in various stages of its execution, exhibit different access pattern behavior.

The present invention addresses this problem by providing a mechanism that enables the page-management policy to be dynamically adjusted based on actual access patterns. As a result, the page-close policy is adjusted for each application (or set of applications accessing the same memory bank) so as to provide an appropriate policy for that application (or set of applications). In one embodiment described in further detail below, the page-close policy is set in accordance with predicted future memory access behavior through use of an aggregated historical record of memory usage by the application.

Figure 1:
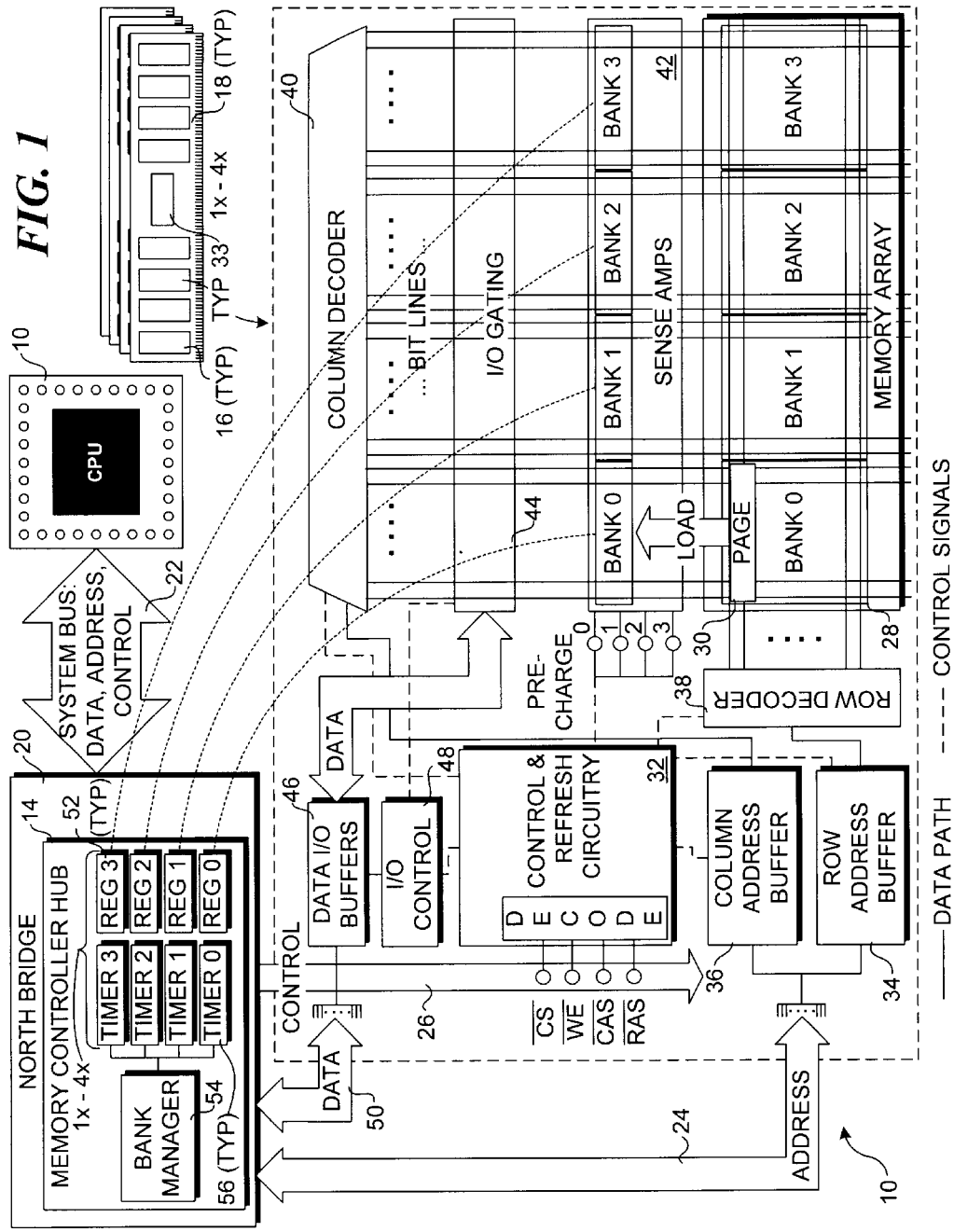
FIG. 1 is a schematic diagram illustrating an architecture corresponding to an exemplary embodiment of the invention by which the dynamically-adjusted page closing policy mechanism of the invention may be implemented.

A framework 10 corresponding to an exemplary implementation of the invention that illustrates various interactions between a processor 12, a memory controller hub (MCH) 14 and a DRAM chip 16 contained on a DIMM 18 is shown in FIG. 1. As discussed above, the invention provides a mechanism by with the page-closing policy of a memory controller (in this case MCH 14) may be dynamically adjusted to meet the actual memory access patterns that are produced during execution of one or more applications running on processor 10 on a memory bank-by-bank basis.

In order to better appreciate the benefit of adjusting the page-close policy and understand its operation, a typical memory access sequence in accordance with framework 10 is now described. The sequence begins when a request for one or more bytes of data or instructions is made by an application (or more typically, an operation system module acting as a proxy for the application) executing on the computer system's processor (e.g., processor 10). Typically, the memory request will reference a memory address range corresponding to where the desired data or instructions are stored in the system memory. For example, a request to load a subroutine will identify the starting and ending addresses corresponding to the memory cells the subroutine instructions are stored in. In the illustrated embodiment, this request is passed to a "North Bridge" chipset 20, which is coupled to processor 12 via a system bus 22. The system bus 22 provides a plurality of system data bus lines, system address bus lines, and system control lines that enable data and requests to be transferred between the processor and other system components connected to the system bus, including various components provided by North Bridge chipset 20.

North Bridge chipsets are commonly used in computer systems that employ PCI (Peripheral Component Interface) devices and peripherals, such as computers that employ Intel processors. Generally, the North Bridge chipset will provide a plurality of functions that may be implemented on multiple chips or a single chip. These functions typically include memory interface functions provided by memory controller such as MCH 14. Optionally, MCH 14 (or a similar memory controller) may be directly connected to processor 12 via the system bus (configuration not shown).

Upon receiving the memory access request, MCH 14 determines the particular memory bank in which the memory is stored, and generates appropriate address signals 24 and control signals 26 to perform a memory access of the bank. As discussed above, each DRAM chip comprises an array of cells logically partitioned into one or more banks. This is depicted as a memory array 28 and Banks 0, 1, 2, and 3 in FIG. 1. Individual memory cells are identified by the addresses of the row and column they reside in. Generally, data and instructions are stored in bytes or words of data, wherein each byte comprises eight adjacent cells and each word comprises the data stored in M adjacent memory cells in the same row, with M representing the length of the word. Typically, to access a particular word, the address for the first bit of the word is provided, with optional information specifying the length of the word. Accordingly, to access a particular set of bytes or words (e.g., related data or instructions) the address range for those data or instructions will be provided to MCH 14. However, rather than only access just the data/instructions within the provided address range, in most modem DRAMS, data corresponding to one or more pages (as necessary) that encompass the address range are retrieved by opening those pages. For purposes of illustration, it will be assumed that a single memory page 30 stored in bank 0 is accessed in the current example.

Opening a memory page comprises having the memory controller sending an ACTIVATE command to DRAM chip 16 (via DIMM 18), wherein an appropriate set of control signals 26 are send to DIMM 18 along with address signals 24 over the computer system's memory bus. In the illustrated embodiment, the control signals include a CS# (chip select) signal, a WE# (write enable) signal, a CAS# (column access strobe) signal, and a RAS# (row access strobe) signal, which are received by a control & refresh circuitry block 32 in DRAM chip 16. It is noted that in some DIMM architectures, control signals and other various signals are received by one or more control chips on the DRAM (depicted as control chip 33 on DIMM 18) that are used to provide top-level control operations for the DIMM's DRAM chips. Thus, in these configurations, the control signals are deciphered by the control chip(s) and appropriate control signals are passed on and/or generated to an appropriate DRAM chip corresponding to the page address specified by the address signals. The ACTIVATE command opens or activates a row specified by the current row address signals, which are latched into a row address buffer 32 in the illustrated embodiment in response to the DRAM receiving control signals an ACTIVATE command. Depending on the particular architecture of the memory controller and the memory bus, the row and column address signals may be sent over a single multiplexed set of address signal lines or via separate groups of addresses signal lines. In response to a READ or WRITE command (as specified by the logic levels of appropriate sets of CS#, WE#, CAS#, and RAS# signals) Column address data are latched into a column address buffer 36 in a similar manner to how row address data are latched. The column and row addresses stored in the row and column address buffers are then decoded by internal circuitry in DRAM chip 16 to identify a corresponding bank and page containing the requested memory access address range, as depicted by a row decoder 38 and a multiplexed column decoder 40.

As discussed above, in modern DRAMs, data is typically accessed on a page-wise basis, rather than a byte- or word-wise basis. At first glance, one might think it would be possible to directly access a row of data within a selected memory bank. However, data may not be accessed directly from the memory cells because of how DRAM memory cells work. DRAM chips are termed "dynamic" RAM because their memory cells have to be dynamically refreshed on a frequent basis (e.g., >1000 or even >10,000 times/sec). This is because each memory cell comprises a "leaky" capacitor that can only hold a charge for a very short duration. In order to maintain data, cells corresponding to logical 1's must be refreshed (i.e., recharged) using a refresh cycle that is automatically performed by control and refresh circuitry block 34 on a continuous basis. As a result, if a cell was to be directly "read," it would lose its charge, and thus its data.

In order to avoid these problems, DRAMS use a plurality of sense amps 42, with one sense amp per column line. Accordingly, the sense amplifiers are partitioned into sense amp banks, wherein the width of each bank corresponds to the page length of its respective corresponding memory array bank. The sense amps perform two functions. One function, as indicated by their name, is that they "sense" the charge held in the memory cell corresponding to their respective column and currently asserted row, and then amplify the sensed signal. For example, if the charge in a given cell is sensed to be above a predetermined threshold, the sense amp generates a voltage signal output corresponding to a logical "1," while if the charge sensed is below the threshold the sense amp generates a voltage signal output corresponding to a logical "0." The second function provided by the sense amps is a buffering function, whereby the amplified signals may be accessed without adversely affecting the charges of the data stored in memory.

In the illustrated embodiment, the sense amps are accessed via an input/output (I/O) gating block 44, which passes data to and receives data from data I/O buffers 46 in response to control signals generated by an I/O control block 48 and control and refresh circuitry block 34. It is noted that the architecture depicted in FIG. 1 is merely exemplary, as various other architecture that are well-known in the art may also be used to transfer data between the sense amps and the data I/O buffers (or directly to the memory bus in unbuffered DIMMs). MCH 14 can then retrieve data stored in data I/O buffers 46 over a memory data bus 50 using an appropriate set of control signals 26 corresponding to READ and WRITE commands.

Typically, the various bytes or words in the page are read out using a sequencing mechanism. For example, some DRAMs provide a burst mode, wherein a plurality of sequentially adjacent bytes and/or words may be rapidly read out using a single read command. Generally, this sequencing is performed by asserting a single row address while rapidly toggling the CAS# signal in combination with providing sequentially changing column access data.

Once data has been accessed from a given page, the corresponding data is maintained in the sense amplifier bank corresponding to the page. In order to access another page of data in the same bank, a PRECHARGE command is issued. This restores the charges in the row and bank of memory cells corresponding to the initial page (also known as a write-back) and prepares the sense amp bank for a new page of data. Generally, the PRECHARGE command will be issued via a combined set of CS#, WE#, CAS# and RAS# signals. In one embodiment common to many memory controller command sets, the PRECHARGE command signal set comprises respective signals of (L, L, H, L) for CS#, WE#, CAS# and RAS#. The particular combination of signals used will be architecturally specific to the control signals provided by the MCH (or similar memory controller); such signal combinations are well-known in the art, and accordingly, these various combinations are not discussed further herein. Once the PRECHARGE command is issued, the bank will not be available for a subsequent access until a predefined (architecture dependent) time has passed. Furthermore, once a bank has been precharged, it is in an idle (empty) state and must be activated with the ACTIVATE command prior to an READ or WRITE command being issued to the bank.

It is apparent from the foregoing discussion that different latencies will arise under various memory access patterns. For example, if a page-close policy provides for automatic page closes for every page access, this policy will be advantageous for applications that have poor locality (i.e., applications that do not access the same memory pages repeatedly), but provide high latencies for applications that have good locality. In contrast, a policy that closes pages only when page misses occur will be advantageous for applications that have good locality, but provide poor performance when the applications has poor locality.

In accordance with the principles of the invention, a dynamically adjustable page-closing policy is provided that produces improved latencies for applications having various different types of memory access patterns. In general, the mechanism for enabling this functionality is based on measuring an actual access pattern, and then adjusting the page-closing policy based on the measured access pattern, under the principle that future access patterns will parallel the prior access patterns. However, it will be understood that the measurement of the actual access patterns is dynamic as well, whereby the page-closing policy may be dynamically adjusted to adapt to changing memory access patterns within an application accessing a bank or banks of memory or a set of applications accessing a shared bank of banks of memory.

In accordance with one embodiment, a timer mechanism is implemented on a per-bank basis. In this embodiment, each memory bank's accesses are tracked by the memory controller (e.g., MCH 14), and the memory controller uses a timer per bank to determine when to close pages. If the timer trip point is set to 0 (or some other special indication), the page will be closed as soon as its last access (i.e., READ or WRITE) has been completed. This is the same as the "page-close" policy discussed above. On the other extreme, if the timer trip-point is set to maximum, the controller will not close the page unless it has to (due to other DRAM architecture rules), or it will close the page after a very long time. This is the same as the "page-open" policy discussed above. For policies in between these two extremes, a timer trip point will determine when pages are closed. The timer trip point is a value that is dynamically adjusted to correspond to recent memory access behavior. A small trip value will cause the mechanism to behave more like the page-close policy, while larger trip values will behave more like the page-open policy. The mechanism further implements a recall operation that stores an identity of the last page that was open for each bank. In other words, the controller remembers which page was open in a particular bank even after it has been closed, unless it has opened a new page instead.

Figure 2:
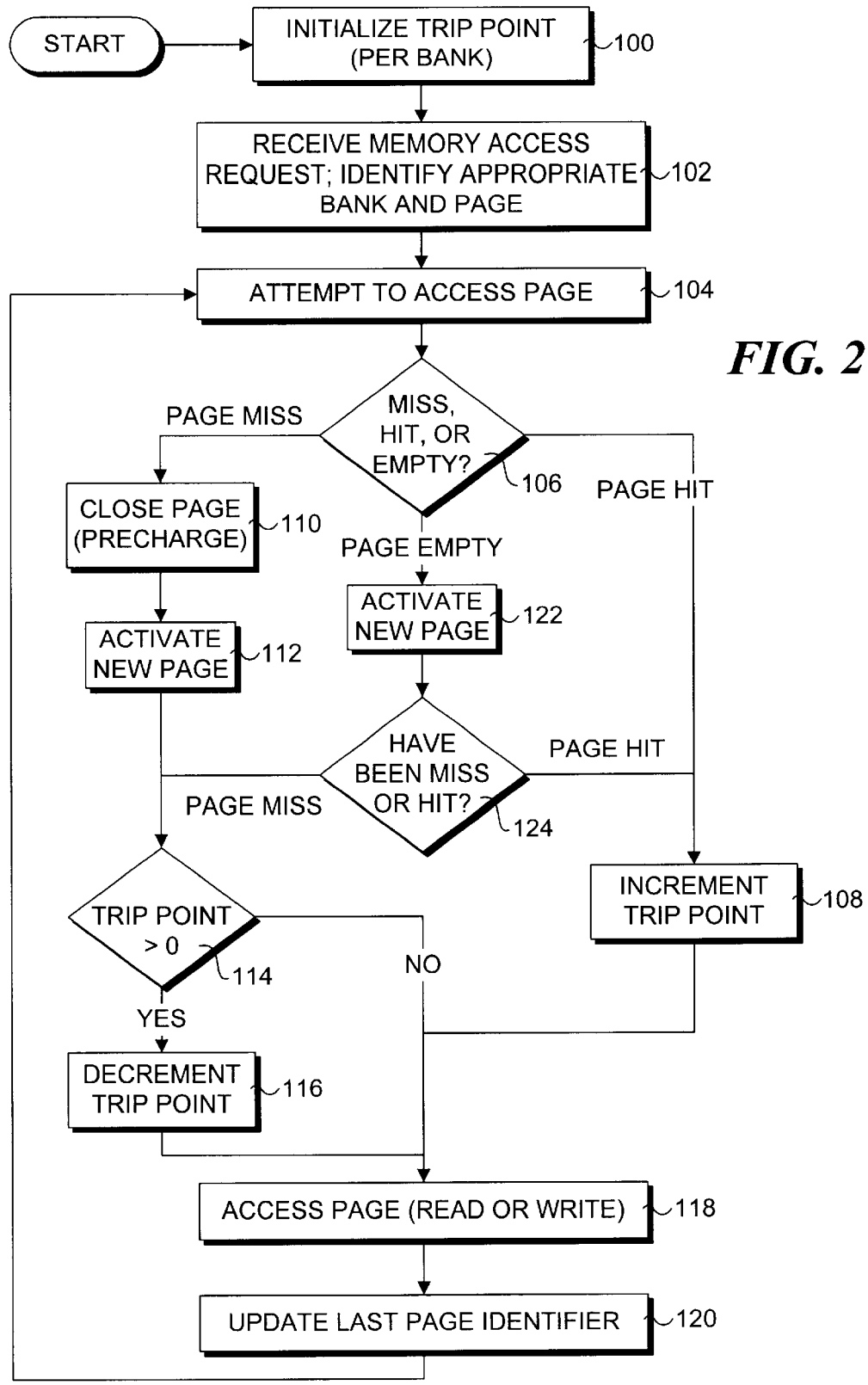
FIG. 2 is a flow chart illustrating the logic used by a memory controller when adjusting a timer trip point that is used to determine when a memory page is closed in accordance with one embodiment of the invention's dynamically-adjusted page closing policy mechanism.

With reference to FIG. 2, the page-close policy adjustment mechanism performs the following operations on a per-bank basis during operation of a computer system that implements the invention. The process starts in a block 100, in which a trip point for each bank is set to an initial value. The initial value may be an averaged value or set specifically for a particular application. For example, if it is known in advance that an application usually provided good locality, the initial value for the trip point may be set at a high value, initializing the behavior of the mechanism policy to correspond with the page-open policy. In contrast, if the application is known to have randomized memory accesses (i.e., poor locality), the initial trip point may be set at a lower value (or even 0), thereby initializing the behavior of the mechanism to be directed toward the page-close policy. In one embodiment, the initial value of the trip point for all banks may be set using a computer set-up parameter, such as those that are accessible during a set-up operation that is generally available during the system's boot-up sequence. In another embodiment, the application or operating system may pass information to the memory controller to set or adjust the initial trip point value. In all embodiments, the trip point value may be stored using various well-known storage schemes, such as CMOS for the set-up parameter and dedicated memory or registers, etc. for run-time settings. It is further noted that in many instances the initial trip point value is substantially irrelevant, since the dynamic nature of the algorithm quickly adapts the memory page-closing policy to an optimized value based on the locality characteristics of the actual access pattern.

In one embodiment, the trip point for each bank is stored in a corresponding register, as depicted by registers 52 in FIG. 1. As indicated by the "1×-4×" reference, the number of banks for a given memory architecture will generally comprise 4, 8, 12, or 16, depending on the architecture of each DIMM and the number of DIMM installed in the system. For example, if a four-bank architecture is used and the system includes 4 DIMMS, the number of banks will be 16. In general, a separate register will be provided for each bank. Optionally, registers may be partitioned to hold information corresponding to two or more banks, depending on the length of the register and other architectural considerations.

After the initial trip point is set, the operations shown below block 100 in FIG. 2 are executed on an ongoing basis, as depicted by an operational loop. At the same time, operations shown in FIG. 3 and discussed below are continually performed on a substantially asynchronous basis. In one embodiment, various non-conventional (i.e., novel to the invention) memory controller operations are provided by a bank manager 54, which is part of the logic implemented by MCH 14, as depicted in FIG. 1. Typically, the bank manager will be implemented using embedded software or gate-level logic common to that used in memory controller circuitry, as will be recognized by those skilled in the art.

The operational loop begins in a block 102 in which the memory controller (e.g. MCH 14) receives a request to access memory from processor 10 and determines a bank and page for the memory access. The memory controller then attempts to access the memory page in a block 104, and a determination is made to whether the page access attempt results in a page-miss, pit-hit, or page-empty state in a decision block 106. If the page is already loaded through a previous access, a page-hit state will result, causing the logic to flow to a block 108 in which the trip point for the current bank is incremented by bank manager 54. In general, the trip point will be incremented by a preset amount that is proportional to the speed of the timer (and/or a timer division factor); for simplicity, the trip point will be incremented by 1 in this example.

If another page is already loaded in the sense amp bank, a page-miss state will result, causing the logic to flow to a block 110 in which the page is closed using the PRECHARGE command. The new page is then loaded using the ACTIVATE command (along with appropriate address information) in a block 112. (It is noted that both of the operations performed in blocks 110 and 112 are normal operations that are automatically performed by memory controllers when a page miss state is sensed by the controller).

After closing the page and activating the new page, the logic proceeds to a decision block 114 in which a determination is made to whether the trip point is greater than 0. If the answer is YES (TRUE), the trip point is decremented in a block 116 by bank manager 54. In a manner similar to incrementing the trip point, the trip point will be decremented by a pre-set amount that is proportional to the timer speed (and/or a timer division factor). For simplicity, in the current example the trip point is decremented by 1.

After the trip point has been incremented or decremented, or if the result of decision block 114 is NO (FALSE), the logic flows to a block 118 in which the page access is performed. This will typically comprise a memory READ or memory WRITE, which is automatically handled by well-known conventional memory controller operations. A "last page" identifier is then updated (as necessary) in a block 120. The last page identifier (e.g., the page's address or similar page identification indicia) is used to store information identifying the last page to be accessed from a corresponding memory bank. In one embodiment, the last page for each bank is stored in a plurality of respective registers in MCH 14, or using another storage mechanism used to record page access information in a conventional memory controller. In one embodiment, the same registers used to store the trip points are also used to store the last page identifier. The logic then loops back to block 102 to respond to the next request for memory access.

If a PRECHARGE command has been previously issued, and no pages have been activated, the result of decision block 106 will correspond to a page empty state. In this instance, a new page is activated in a block 122 and the logic proceeds to a decision block 124. This decision blocks performs a check to see if the access would have resulted in a page-miss or page-hit state had the page that previously resided in the bank prior to the last PRECHARGE command still been available by checking the page identifier stored for the bank (e.g., performing a register lookup in embodiments in which the page identifiers are stored in registers). If the access would have resulted in a page-miss state, the logic flows to decision block 114 (and block 116, as appropriate), wherein the trip point is decremented if it is greater than 0. If the page access would have resulted in a page-hit state, the logic flows to block 108 to increment the trip point.

Figure 3:
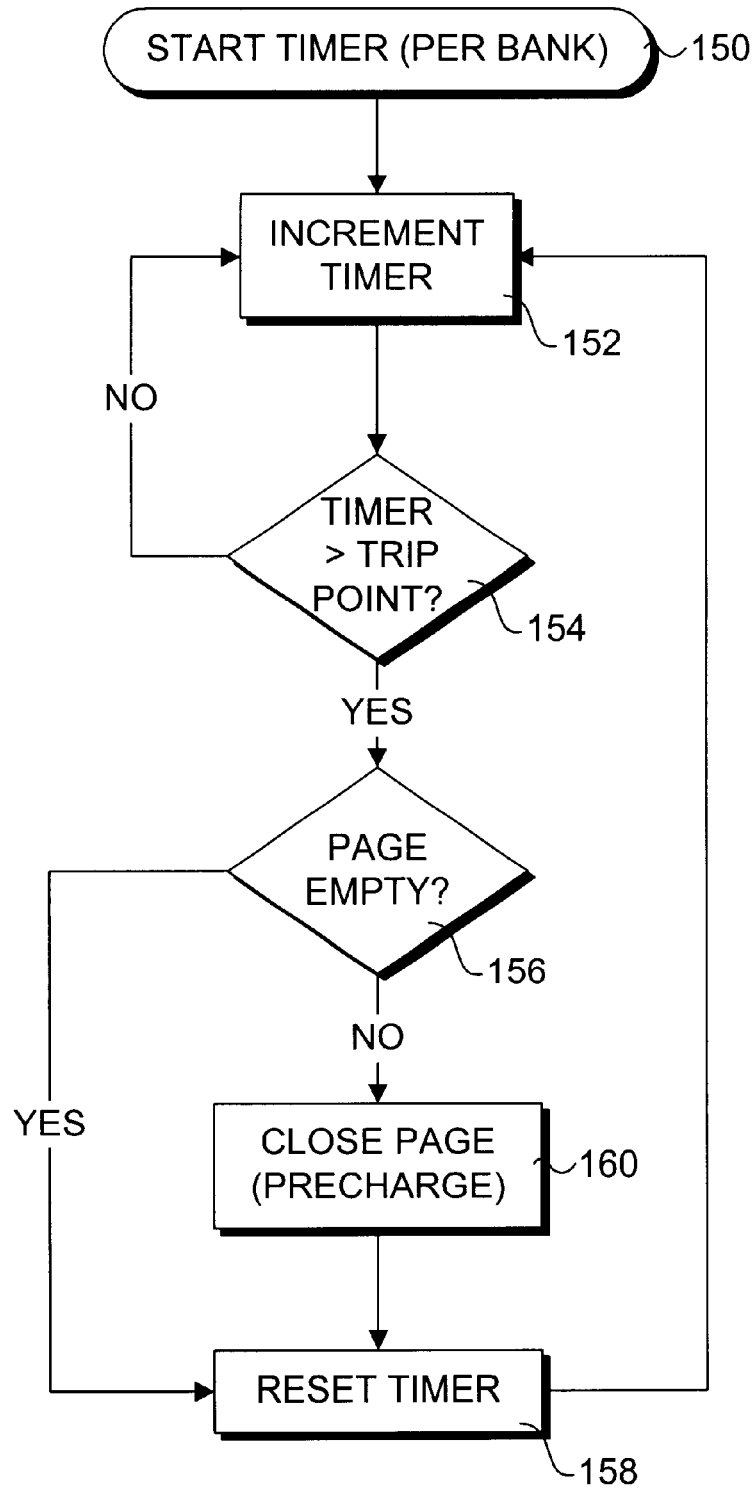
FIG. 3 is a flow chart illustrating the logic used by the memory controller to close a page based on a current timer value and timer trip point in accordance with the embodiment of FIG. 2.

Rather than closing pages in one of the conventional manners discussed above, the invention implements the timers and trip point values to determine when pages are to be closed (in addition to closing pages in response to page misses in the normal fashion). The logic for implementing this mechanism is shown in FIG. 3, and begins by starting a timer for each bank in a block 150. Various types of timers may be used for this purpose. For example, MCH 14 may include one or more dedicated counters that may be driven by timing signals provided by MCH 14 or the system clock. Optionally, other various other types of system timers may be used. In a block 152, the timer is incremented. In general, when a counter is used for a timer, the counter will increment each time it receives a new clock cycle (e.g., when it senses a leading edge or logic level change in a clock signal that is used to drive it).

Figure 4:
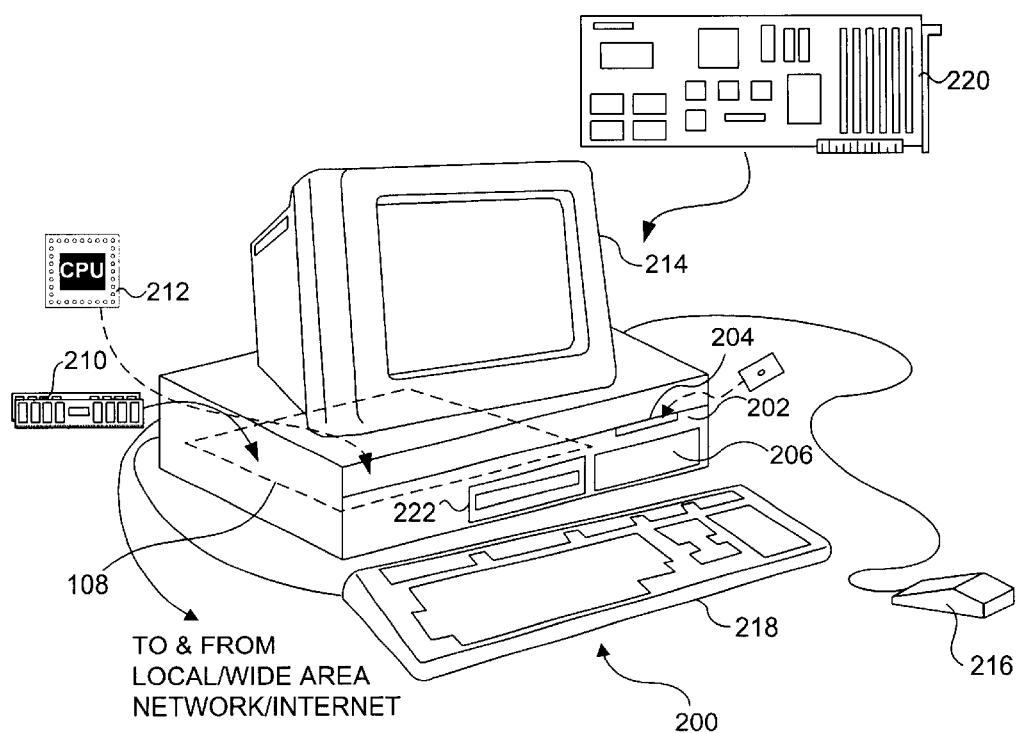
FIG. 4 is a schematic diagram of an exemplary computer system that is suitable for implementing the present invention.

Next, in a decision block 154, a determination is made to whether the timer has exceeded the trip point. If it has not, the determination of decision block 154 is NO (FALSE) and the logic loops back to block 152 to increment the timer, with the logic of blocks 152 and 154 being repeated until the timer has exceeded the trip point. When it has exceeded the trip point, the answer to decision block 154 will be YES (TRUE), and the logic will proceed to a decision block 156, in which a determination is made to whether the page is empty (i.e., was previously closed with not subsequent loading of a new page). If the answer is YES (TRUE), the logic proceeds to a block 158 in which the timer is reset, and then loops back to block 152. If the page is not empty, a PRECHARGE command is issued to close the page in a block 160 and then the timer is reset in block 158. It will be understood that the actual order used in closing a page and resetting the timer is optional—e.g., under an appropriate condition the timer may be reset prior to closing the page, or vice-versa, whatever order is desired for the implementation.
Exemplary Computer System for Practicing the Invention With reference to FIG. 4, a generally conventional computer 200 is illustrated, which is suitable for use as the computer system in connection with practicing the present invention. Conventional computer 200 exemplifies various types of computer systems that may be suitable for implementing the invention, including PC-class systems operating the Windows 95, 98, 2000, ME, XP or NT operating systems, UNIX workstations operating UNIX-based operating systems, and various computer architectures that implement LINUX operating systems. Computer 200 is also intended to encompass various server architectures, as well as computers having multiple processors.

Computer 200 includes a processor chassis 202 in which are mounted a floppy disk drive 204, a hard drive 206, a motherboard 208 populated with appropriate integrated circuits including memory 210 (e.g., DRAM DIMMs), one or more processors (CPUs) 212, and a power supply (not shown), as are generally well known to those of ordinary skill in the art. The motherboard 208 further includes a memory controller (not shown) configured to perform the operations discussed above provided by MCH 14. In exemplary embodiments processor 212 comprises an Intel PENTIUM III™ or PENTIUM IV™ processor and the memory controller comprises one of various MCH's the support these processors, such as the Intel 82845 MCH or 82815(E) MCH. It will be understood that hard drive 106 may comprise a single unit, or multiple hard drives, and may optionally reside outside of computer 200. A monitor 214 is included for displaying graphics and text generated by software programs and program modules that are run by the computer. A mouse 216 (or other pointing device) may be connected to a serial port (or to a bus port or USB port) on the rear of processor chassis 202, and signals from mouse 216 are conveyed to the motherboard to control a cursor on the display and to select text, menu options, and graphic components displayed on monitor 216 by software application programs and modules executing on the computer. In addition, a keyboard 218 is coupled to the motherboard for user entry of text and commands that affect the running of software programs executing on the computer. Computer 200 also includes a network interface card 220 of built in network adapter for connecting the computer to a computer network, such as a local area network, wide area network, or the Internet.

Computer 200 may also optionally include a compact disk-read only memory (CD-ROM) drive 222 into which a CD-ROM disk may be inserted so that executable files and data on the disk can be read for transfer into the memory and/or into storage on hard drive 206 of computer 200. Other mass memory storage devices such as an optical recorded medium or DVD drive may be included. The machine instructions comprising the software that causes the CPU to implement the functions of the present invention that have been discussed above will likely be distributed on a machine-readable media such as floppy disks or CD-ROMs (or other memory media) and stored in the hard drive until loaded into random access memory (RAM) for execution by the CPU. In addition, a machine-readable medium can include propagated signals such as electrical, optical, acoustical or other form of propagated signals (e.g., carrier waves, infrared signals, digital signals, etc.) that enable the machine instructions to be loaded via a computer network.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. A method comprising:

monitoring memory accesses to a memory bank; and dynamically adjusting a memory page closing policy for the memory bank based on locality characteristics of its memory accesses wherein monitoring memory accesses comprises determining whether each memory page access results in a page-miss or a page hit state; and dynamically adjusting the memory page closing policy towards a page-open policy if there are more page-hit states than page-miss states that are monitored, wherein the page-open policy leaves a page open until it is required to be closed by a page-miss or memory component architectural requirements; otherwise dynamically adjusting the memory page close policy towards a page-close policy if there are more page-miss states than page-hit states, wherein the page-close policy immediately closes a memory page upon completing access to the memory page.

2. The method of claim 1, further comprising:
tracking a last memory page accessed from the memory bank; and
determining whether a memory page access results in a page empty state, and if the page access does:
dynamically adjusting the memory page closing policy towards the page-open policy if a page-hit state would have resulted had the last memory page still been loaded into the memory bank; otherwise
dynamically adjusting the memory page closing policy toward the page-close policy if a page-miss state would have resulted had the last memory page still been loaded into the memory bank.

3. The method of claim 1, wherein the method is employed in a computer system having system memory partitioned into a plurality of memory banks and the operations of the method are implemented simultaneously on each of said plurality of memory banks to dynamically adjust respective page closing policies for each memory bank.

4. A method for dynamically adjusting a memory page closing policy, comprising:
initializing a memory close trip point;
starting a timer count;
accessing a memory page in a memory bank, and in response thereto:
opening the memory page;
determining whether the access to the memory page produces a page-miss or a page-hit state;
increasing the memory close trip point if the memory page access results in a page-hit state;
decreasing the memory close trip point if the memory page access results in a page-miss state, closing the memory page, and restarting the timer count;
repeatedly accessing memory pages in the memory bank and performing the foregoing operations in response thereto while determining if the timer count has exceeded the memory trip point; and
closing any open memory page when the timer count exceeds the memory close trip point after completion of any current access to the memory page.

5. The method of claim 4, further comprising:
tracking a last memory page accessed from the memory bank; and
determining whether a memory page access results in a page empty state, and if the page access does:
increasing the memory close trip point if a page-hit state would have resulted had the last memory page still been loaded into the memory bank; otherwise
decreasing the memory close trip point if a page-miss state would have resulted had the last memory page still been loaded into the memory bank.

6. The method of claim 5, wherein data identifying the last memory page accessed from the memory bank is stored in a register.

7. The method of claim 4, wherein the method is employed in a computer system having system memory partitioned into a plurality of memory banks and the operations of the method are implemented simultaneously on each of said plurality of memory banks to dynamically adjust respective memory page closing policies for each memory bank.

8. The method of claim 5, wherein the method is employed in a computer system having system memory partitioned into a plurality of memory banks and the operations of the method are implemented simultaneously on each of said plurality of memory banks to dynamically adjust respective memory page closing policies for each memory bank.

9. The method of claim 8, wherein indicia identifying the last memory page accessed from each memory bank is stored in a respective register.

10. A circuit comprising:
an interface to a memory controller that controls memory access in a computer system having system memory partitioned into a plurality of memory banks;
embedded logic that causes the circuit to perform operations when operating in the computer system, including:
monitoring memory access patterns for each of said plurality of memory banks;
determining a respective locality characteristic of each of the memory access patterns;
dynamically adjusting a memory page closing policy for each of said plurality of memory banks based on the locality characteristic for that memory bank; and
providing indicia corresponding to the memory page closing policy for each of said plurality of memory banks to the memory controller
wherein determining the locality characteristics of a memory access pattern includes:
determining whether a memory page access to a given memory bank results in a page-miss or a page hit state; and
dynamically adjusting the memory page closing policy for the given memory bank towards a page-open policy if there are more page-hit states than page-miss states that are monitored during memory page accesses to that bank, wherein the page-open policy leaves a page open until it is required to be closed by a page-miss or memory component architectural requirements; otherwise
dynamically adjusting the memory page close policy for the given memory bank toward a page-close policy if there are more page-miss states than page-hit states, wherein the page-close policy immediately closes a memory page upon completing access to the memory page.

11. The circuit of claim 10, wherein the embedded logic further performs the operations of:
tracking a last memory page accessed from each of said plurality of memory banks; and
determining whether a memory page access to a given memory bank results in a page empty state, and if that page access does:
dynamically adjusting the memory page closing policy for that memory bank towards the page-open policy if a page-hit state would have resulted had the last memory page still been loaded into that memory bank; otherwise
dynamically adjusting the memory page closing policy for that memory bank toward the page-close policy if a page-miss state would have resulted had the last memory page still been loaded into the memory bank.

12. The circuit of claim 10, wherein the circuit comprises a portion of circuitry in a memory controller hub.

13. The circuit of claim 10, wherein the circuit comprises a portion of circuitry in a North Bridge chipset component.

14. A memory control component, comprising:
a system interface to operatively couple the memory control component to a processor in a computer system having system memory operatively coupled to a memory bus and partitioned into a plurality of memory banks;

a memory interface to operatively couple the memory control component to the memory bus;

embedded logic that causes the memory control component to perform operations when operating in the computer system, including:

initializing a memory close trip point for at least one memory bank;

starting a timer count;

performing memory page accesses to a memory bank in response to memory access requests from the processor, and in response thereto:

opening the memory page;

determining whether the access to the memory page produces a page-miss or a page-hit state;

increasing the memory close trip point if the memory page access results in a page-hit state;

decreasing the memory close trip point if the memory page access results in a page-miss state, closing the memory page, and restarting the timer count; and repeatedly accessing memory pages in the memory bank and performing the foregoing operations in response thereto while determining if the timer count has exceeded the memory trip point; and closing any open memory page in the memory bank when the timer count exceeds the memory close trip point after completion of any current access to the memory page.

15. The memory control component of claim 14, wherein the embedded logic performs the operations simultaneously on each of said plurality of memory banks to dynamically adjust respective memory page closing policies for each memory bank.

16. The memory control component of claim 14, wherein the embedded logic further performs the operation of:

tracking a last memory page accessed from the memory bank; and determining whether a memory page access results in a page empty state, and if the page access does:

increasing the memory close trip point if a page-hit state would have resulted had the last memory page still been loaded into the memory bank; otherwise decreasing the memory close trip point if a page-miss state would have resulted had the last memory page still been loaded into the memory bank.

17. The memory control component of claim 16, further including a plurality of registers, each register to store indicia identifying one or more last memory pages accessed from the memory bank(s) to which that register corresponds.

18. The memory control component of claim 14, further including a plurality of timers, each timer providing a timer count for a respective memory bank.

19. The memory control component of claim 14, wherein the memory control component comprises a memory controller hub.

20. The memory control component of claim 14, wherein the memory control component comprises a portion of a North Bridge chip set.

\* \* \* \* \*

UNITED STATES PATENT AND TRADEMARK OFFICE
CERTIFICATE OF CORRECTION

PATENT NO. : 6,799,241 B2
DATED : September 28, 2004
INVENTOR(S) : Kahn et al.

It is certified that error appears in the above-identified patent and that said Letters Patent is hereby corrected as shown below:

Column 4,
Line 48, delete "modem" and insert -- modern --.

Column 23,
Line 23, delete "modem" and insert -- modern --.

Signed and Sealed this

Eighteenth Day of October, 2005

JON W. DUDAS
*Director of the United States Patent and Trademark Office*